United States Patent Office 3,052,644
Patented Sept. 4, 1962

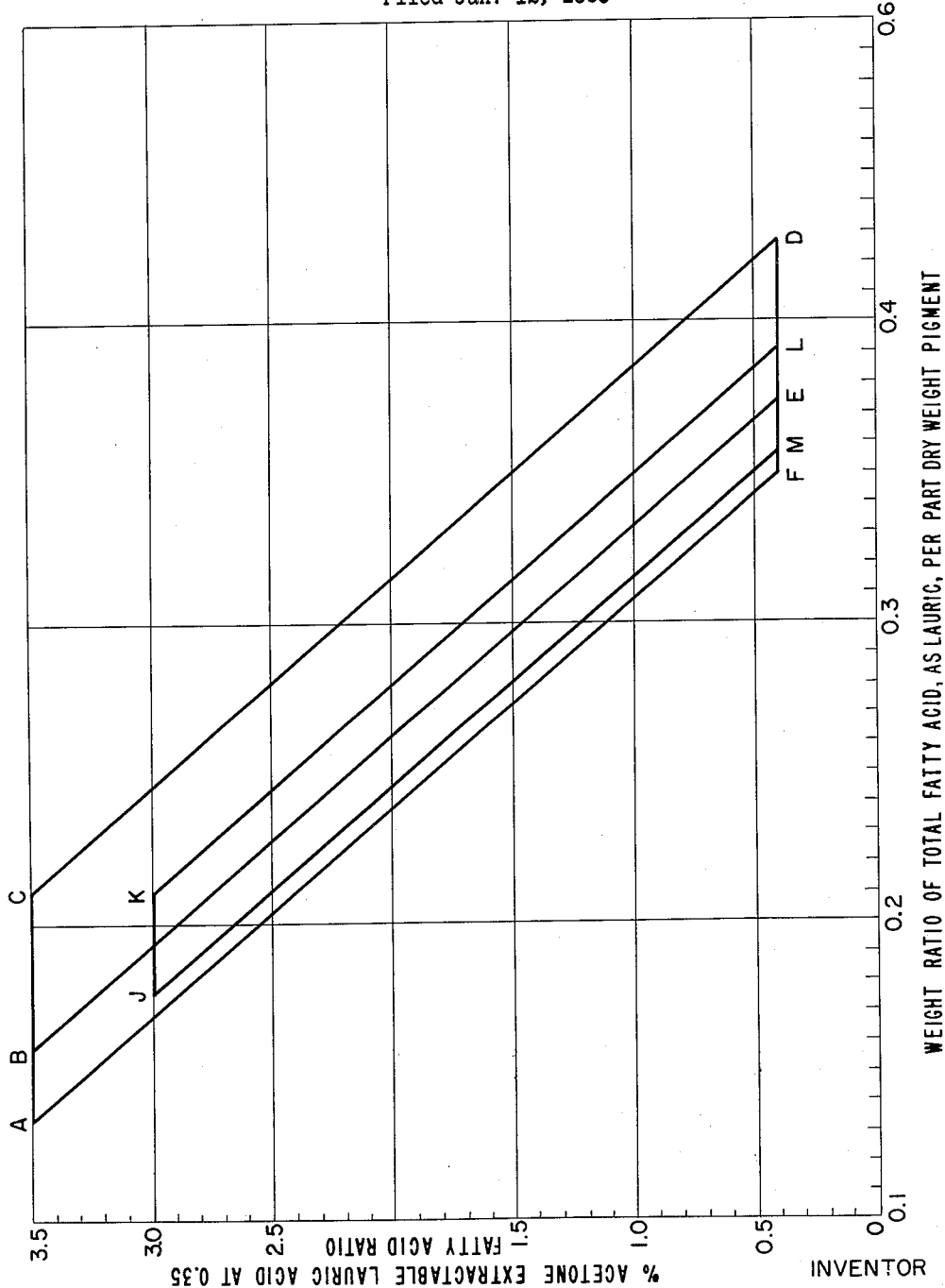

3,052,644
PIGMENT COMPOSITION AND PROCESS
Webster Harold Edwards, Springfield, Pa., assignor to
E. I. du Pont de Nemours and Company, Wilmington,
Del., a corporation of Delaware
Filed Jan. 12, 1959, Ser. No. 786,318
20 Claims. (Cl. 260—22)

This invention relates to a mix-in colloidalhydrophobic hydrous iron oxide pigment composition, to the method of preparing this hydrophobic product from a water-wet colloidal hydrous iron oxide pigment pulp, and to improved transparent coating compositions containing this hydrophobic colloidal pigment composition.

The merits of colloidal hydrous iron oxide pigment are well known in the coating art. For example, U.S. Patent 2,335,760 discloses the preparation of colloidal hydrous ferric oxide pigment as a water-wet pulp and the formulation of coating compositions, particularly cellulose nitrate lacquer compositions, having this water-wet hydrous iron oxide pigment transferred to the hydrophobic organic film-forming vehicle comprising the cellulose nitrate. Hydrous ferric-ferrous oxide pigment and coating compositions containing the same are also described in U.S. Patent 2,466,770. Translucent metallic enamels which include colloidal hydrous iron oxide pigment in the composition thereof are described in Reissue Patents 23,-722 and 23,757, reference being made therein to the hydrous iron oxide pigments of U.S. Patents 2,335,760 and 2,384,579 and to the pigment flushing method of U.S. Patent 2,140,745. Although these prior art inventions have enjoyed significant commercial success, particularly in the field of automobile finishes based on cellulose nitrate and alkyd resins, simpler and more economical techniques for stably converting the water-wet hydrous iron oxide pigment to a hydrophobic pigment composition which can be easily mixed into a wide variety of film forming organic coating vehicles have been sought as the demand for these colloidal hydrous oxide pigments increased. A hydrophobic colloidal hydrous iron oxide pigment composition which can be compatibly dispersed in a variety of film-forming organic coating vehicles by simple mixing without a lengthy period of grinding or with application of high shearing forces is particularly desired. In this direction, colloidal hydrous iron oxide pigment particles have been provided with a hydrophobic surface coating treatment with a hydrophobic organic acid, such as the higher fatty acids of natural occurring glyceride oils.

In my copending application Serial No. 562,651, filed April 15, 1957, now U.S. Patent 2,917,400, of which the present application is a continuation-in-part, I describe the processing of water-wet colloid hydrous iron oxide pigment pulp with a $C_6$ to $C_{24}$ fatty acid, preferably a $C_8$ to $C_{16}$ saturated fatty acid, in the proportion of from 0.2 to 1.2 parts by weight of said fatty acid per part by weight of $Fe_2O_3$ corresponding to the iron content of the pigment and removing the water of the pulp and water of reaction released during processing in the presence of a water-insoluble volatile liquid organic solvent for the fatty acid. The resulting water-free hydrophobic pigment composition is then fractionated by centrifugal means in which a centrifugal force of at least 6000 times the force of gravity is developed to separate therefrom, as a pigment sludge, particles having a pigment particle size larger than is desired. The centrifugally refined colloidal hydrous iron oxide product exhibits superior brilliance, transparency and two-tone effect in cellulose nitrate finishes and alkyd resin finishes in comparison with the same original colloidal hydrous iron oxide pigment transferred to these hydrophobic vehicles by pigment flushing techniques well known in the art. When the hydrophobic pigment product corresponding to the pigment composition of my copending application prior to the centrifugal refining stage is simply mixed with a cellulose nitrate lacquer vehicle, without application of significant shearing forces, the quality of the resulting lacquer enamel is at least equal to that of a cellulose nitrate lacquer prepared by flushing the same original colloidal pigment into the cellulose nitrate lacquer vehicle according to the teachings of U.S. Patents 2,140,745 and 2,335,-760.

While the quality and perfoormance of the centrifugally refined colloidal pigment product having a fatty acid ratio up to 1.2 part of said hydrophobic fatty acid per part by weight of $Fe_2O_3$ as described in my aforementioned copending application is significantly superior to the unrefined composition, particularly when incorporated in cellulose nitrate lacquer vehicles, the hydrophobic colloidal hydrous iron oxide pigment product, refined or unrefined, exhibits limited compatibility in certain classes of film-forming polymer coating vehicles, such as alkyd resin coating vehicles and particularly in coating vehicles comprising a polymer of methyl methacrylate. When the limit of compatibility is exceeded, the resulting cloudiness obscures the desirable characteristics of brilliance, transparency and two tone effect normally attributed to the presence of the colloidal hydrous iron oxide pigment particles. The inadequate compatibility appears either in the liquid coating composition, in the dry finish derived therefrom or in both.

In a search for an explanation and remedy for the incompatibility of the hydrophobic pigment composition in certain polymer coating vehicles, I discovered that the problem is partially solved when the indicated hydrophobic fatty acid component is used at a low ratio, i.e. at a weight ratio ordinarily in the range of about 0.15 to 0.35 part of the hydrophobic fatty acid component, expressed as lauric acid, per part dry weight of the colloidal hydrous iron oxide pigment.

I further discovered that the problem is completely solved when the fatty acid weight ratio is further controlled to provide the resulting hydrophobic pigment product with a content of organic solvent extractable hydrophobic fatty acid in the range of 0.4% to 1.5%, expressed as lauric acid, based on the non-volatile content of the hydrophobic pigment product. Inasmuch as the useful ratio of total hydrophobic fatty acid represents significantly more than the indicated 1.5% maximum of organic solvent extractable hydrophobic fatty acid, a major proportion of the total fatty acid is surface bound acid, i.e. fatty acid combined in the pigment product in a state unextractable by organic solvent, e.g. by acetone. I found that a given low weight ratio of the hydrophobic fatty acid component, e.g. at 0.35, the amount of solvent extractable fatty acid, i.e. free state hydrophobic fatty acid, in the hydrophobic pigment product varies widely because of significant lot to lot variation in the specific surface area of the starting colloidal pigment. The hydrophobic fatty acid non-extractable by organic solvent is present in the pigment product as a molecularly thin hydrophobic surface layer on the pigment particles and the amount of this non-extractable surface-bound fatty acid varies with the specific surface area of the pigment. The free state, organic solvent extractable hydrophobic fatty acid represents that portion of the total hydrophobic fatty acid in excess of the amount which satisfies the surface area demands of the colloidal pigment particles for the hydrophobic fatty acid. Thus, variation in the content of organic solvent extractable hydrophobic fatty acid, i.e. free state fatty acid, at a given fatty acid ratio is an indirect empirical measure of variation in the specific surface area of the colloidal pigment.

I found that a total hydrophobic fatty acid weight ratio of 0.35, the hydrophobic fatty acid being either lauric acid or refined coconut oil acids having an assay of at least 90% lauric acid equivalent, is particularly useful in characterizing the specific surface area of the colloidal hydrous iron oxide pigment by this empirical means. Using this ratio to characterize numerous commercial lots of water-wet colloidal hydrous iron oxide pigment pulp, I found that the content of acetone extractable, free state hydrophobic fatty acid in the resulting hydrophobic pilot pigment product ordinarily varies from about 0.4% to 3.5% and in some instances up to 5%, expressed as lauric acid, based on the non-volatile content of the characterizing hydrophobic pigment pilot product. In evaluating these pilot pigment products derived from different lots of the colloidal hydrous iron oxide pigment, I found that those lots of the pigment having a specific surface area corresponding to a content of acetone extractable hydrophobic fatty acid up to 1.5%, preferably from about 0.5% to 1.0% expressed as lauric acid, in the hydrophobic pigment product state are adequately compatible in a liquid coating vehicle comprising a solution of a polymer of methyl methacrylate in a volatile organic solvent therefor, which solution I found to be particularly suitable for testing the compatibility of the hydrophobic pigment product. I further found that those lots of the colloid pigment having a specific surface area corresponding to a content of acetone extractable hydrophobic fatty acid greater than 1.5% at the 0.35 ratio and which in the hydrophobic pigment pilot product state are not sufficiently compatible in the test coating vehicle, yield compatible hydrophobic pigment products when the total fatty acid weight ratio is approximately less than the 0.35 pilot ratio to compensate for a lower specific surface area and the correspondingly lower demand for hydrophobic fatty acid unextractably bound to the surface of the colloidal pigment particles. A content of at least 0.4% of solvent extractable hydrophobic fatty acid on the indicated basis is desirable for reasons of stability of the hydrophobic product and coating compositions containing the same.

The drawing summarizes the results of my experiments characterizing the relationship between the surface area of the pigment and the fatty acid weight ratio required to provide an adequately compatible hydrophobic pigment product. In the drawing, the ordinate axis represents the ordinary variation of the specific surface area of the colloidal pigment as empirically expressed in terms of the free state, acetone extractable hydrophobic fatty acid in the hydrophobic pigment pilot product prepared at the pigment-surface-characterizing pilot ratio of 0.35 part by weight or refined coconut oil acids per part dry weight colloidal hydrous iron oxide pigment in the water wet pigment pulp. The abscissa axis represents the weight ratio of the useful hydrophobic fatty acid component, expressed as lauric acid, per part dry weight colloid hydrous iron oxide pigment required within the operative area ACDF in providing the hydrophobic pigment product with a free state, acetone extractable hydrophobic fatty acid content in the range of 0.4% to 1.5% on the indicated basis. Line AF defines weight ratios of total hydrophobic fatty acid component which provide the minimum 0.4% content of free state, organic solvent extractable hydrophobic fatty acid and line CD defines fatty acid weight ratios which provide the maximum 1.5% content of free state hydrophobic fatty acid. Line BE defines useful ratios of total hydrophobic fatty acid which provide the particularly preferred 0.75% content of free state, acetone extractable hydrophobic fatty acid, expressed as lauric acid. Of the preferred operating area JKLM, the line JM defines weight ratios of total hydrophobic acid component which provide the product with about 0.5% of the acetone extractable hydrophobic fatty acid and line KL defines ratios which provide the product with about 1.0% of the free state, acetone extractable hydrophobic fatty acid, expressed as lauric acid.

Within the scope of my invention, I prepare useful highly compatible hydrophobic colloidal hydrous iron oxide pigment compositions by mixing, in certain critical proportions, a water wet pulp of colloidal hydrous iron oxide pigment with a solution of a hydrophobic fatty acid component comprising at least one $C_6$ to $C_{24}$ aliphatic monocarboxylic fatty acid including a major weight proportion of at least one $C_8$ to $C_{16}$ saturated aliphatic monocarboxylic acid, preferably lauric acid, in a water-insoluble volatile liquid organic diluent comprising a non-polar solvent for the fatty acid component at a temperature from about 50° C. to about 90° C., preferably from 55° C. to 75° C., for an effective period of at least 30 minutes, preferably 60 to 150 minutes, sufficient to coat the colloidal pigment particles with a molecularly thin surface layer of the hydrophobic fatty acid and to release water, then separating water from the water-wet hydrophobic pigment composition by water-removing means including azeotropic distillation as the final step in water-removal to yield a water-free hydrophobic colloidal hydrous iron oxide pigment product, the azeotrope comprising water and at least one component of the volatile liquid organic diluent, and thereafter cooling the product to a temperature below about 40° C. The starting colloidal hydrous iron oxide pigment having a specific surface area corresponding empirically to the range of about 0.4% to 3.5% of acetone-extractable hydrophobic fatty acid, expressed as lauric acid, at the characterizing pilot ratio of 0.35 part of refined coconut oil fatty acids per part dry weight of the colloid hydrous iron oxide pigment as defined by the ordinate axis of the drawing is mixed with the organic solvent solution containing as the solute the critical proportion of the hydrophobic fatty acid component for which the pertinent fatty acid weight ratio per part dry weight colloidal pigment is defined by a value on the abscissa axis for coordinates within the area ACDF. This area embraces fatty acid ratios which yield hydrophobic colloidal hydrous iron oxide pigment products having a content of free state acetone extractable hydrophobic fatty acid in the range of 0.4% to 1.5% by weight, expressed as lauric acid, based on the non-volatile content of the product.

I prepare compatible organic coating compositions from the hydrophobic colloidal hydrous iron oxide pigment product by simply mixing the pigment product with a liquid coating composition vehicle comprising a clear compatible solution of a soluble organic film-forming polymer in a volatile liquid organic solvent for the polymer including a major proportion of a non-polar organic component, the pigment being present in an amount up to 15% by weight of the composition and at a weight ratio up to one part of the pigment per part of the film-forming organic polymer. Application of high shearing forces during the mixing are unnecessary to adequately disperse the pigment in the film-forming organic coating vehicle.

The detailed procedure for establishing empirically the specific surface area of the lots of the colloidal hydrous iron oxide pigment or characterizing the surface demand of the colloid pigment particles for a molecularly-thin non-extractable surface layer of the hydrophobic fatty acid is as follows:

(a) 400 grams of industrial xylol, commercially designated as 10° xylol, and 155 grams of refined coconut oil fatty acids, commercially designated as 90% minimum lauric acid and ordinarily having an assay of at least 95% lauric acid equivalent are charged into a 3000 ml. size stainless steel reaction flask equipped with a heating mantle, heat control means, stirring means, and distillation means including an 18 inch bulb-type reflux condenser and a water separator. The charge is slowly stirred and heated to 55° C. to 60° C. to dissolve the fatty acids, (b) 444 grams dry weight of water-wet hydrous iron oxide pigment pulp, commercially available "Auric Brown Pulp" F–4–P, based on the solids determination of the pulp, are combined with the fatty acid solution in the reaction flask and mixed with moderate agitation for about 60 minutes at 60° C. to 65° C., the agitation being increased if necessary to reduce foaming, (c) The hydrophobic phase comprising the pigment solids and the water-insoluble liquid diluent is allowed to settle for 60 minutes while heating and agitation are discontinued, water released during the reaction thereby forming a supernatant liquid layer, (d) The supernatant water layer is substantially removed by decantation, (e) Residual free water is removed by azeotropic distillation while the composition is agitated at a rapid speed, the distillation initiating at about 92° C., the water of the condensed azeotropic distillate being separated by the water trap and the xylol being returned to the flask by an overflow in the water trap. The distillation is continued until a sample of the condensed distillate is water-free and the temperature of the product in the still is at 133° C. to 135° C., and (f) Heating is discontinued and the hydrophobic pigment product is allowed to cool to room temperature of about 25° C., agitation being continued to assist the cooling.

The acetone-extractable free hydrophobic fatty acid content of the hydrophobic pigment product is determined as follows: A sample of about 10 grams of the hydrophobic pigment product is weighed to the second decimal place in a ½ pint jar having a screw top, 100 ml. of acetone are added to the sample, the jar is sealed and mounted in an agitator of the ordinary paint reconditioning type, Red Devil reconditioner, where it is vigorously agitated for 10 minutes. The sample is filtered through dry #1 Whatman filter paper of 9 cm. diameter in a Buchner funnel over a 1000 ml. vacuum flask having a trap in the line to prevent water contamination. The filtrate is refiltered through the filter cake until clear and the filtration is stopped before the filter cake is dry and cracked. A second vacuum flask is substituted for the first and the first filtrate is poured into the Buchner funnel and refiltered, followed by the acetone rinses from the first flask, the ½ pint jar and the funnel totaling three 50 ml. acetone rinses which are filtered into the second flask. 1 ml. of 1% phenolphthalein in anhydrous alcohol is added to the filtrate including the rinses in the second flask and titrated to phenolphthalein end point with 0.05 N alcoholic KOH. A blank of 250 ml. of acetone is similarly titrated. The acetone-extractable free fatty acid, expressed as lauric acid, is calculated by the following equation:

Percent free lauric acid (based on solids)

$$= \frac{(\text{ml. of KOH for sample minus ml. KOH of blank}) \times N \times 20}{\text{Sample weight} \times \text{solids content of sample}}$$

where N is the normality of the KOH solution.

The detailed procedure for evaluating the compatibility of the hydrophobic colloid hydrous iron oxide pigment products in the compatibility-critical organic coating vehicle comprising a solution of polymer of methyl methacrylate is as follows:

A 35 gram sample of the hydrophobic pigment product, based on 60% non-volatile content in xylol, is thinned with 250 grams of toluol in a one quart can and mixed with moderate agitation for about 60 minutes using a 3 bladed 3" diameter mixing propeller set ⅛" from the bottom of the can. To this mixture, 104 grams of a solution of 40% by weight of a copolymer of methyl methacrylate and methacrylic acid in a mixture of about 80 parts toluol and about 20 parts acetone by weight are added with non-splashing agitation. The acidic copolymer is derived from a monomer mixture consisting of 98 parts of methyl methacrylate and 2 parts by weight of methacrylic acid polymerized to a relative viscosity at 25° C. in the range of 1.117 to 1.196 corresponding to a molecular range of from about 55,000 to about 105,000. The relative viscosity of the copolymer is determined using a solution of 0.25 gram of the copolymer in 50 ml. of ethylene dichloride in accordance with the procedure of ASTM–D–445–46T Method B. The composition is mixed for about 240 minutes. A sample of the resulting liquid coating composition is flowed out on a glass plate and examined for transparency in both the wet state and in the dry state after loss of the volatile diluent from the wet coating. The wet thickness of the flow out on glass is sufficient to provide a dry coating thickness of from 0.7 to 1.5 mils.

The dry flow-out is compared with an arbitrary, but uniform, preestablished clarity rating scale of 0 to 10 in which 0 represents opacity or complete hiding and 10 is full clarity or transparency. For purposes of this invention, a value of 8 or higher on this scale corresponds to satisfactory compatibility and clarity.

While this simple practical clarity scale ordinarily is adequate, the clarity of the pigmented composition can be precisely determined and numerically expressed by measuring the clarity with a Leeds and Northrup angular-dependence scattered light measuring apparatus following the method described in the supplier's pamphlet D.B. 2093. By this method, a clarity value, C, in the range of 2.5 to 2.0 corresponds to rating 8 on the aforementioned arbitrary preestablished scale. Rating 10 on the arbitrary scale corresponds to a clarity value, C, of 1 or less. Based on this compatibility test, the test coating composition formulated as described with hydrophobic hydrous iron oxide pigment products having an acetone-extractable free fatty acid content of 0.75% or less exhibits a clarity in the rating scale range of 10 to 9.5. Hydrophobic pigment products having a free acid content in the range of 0.75% to 1.2% ordinarily yield values in the clarity rating scale range of 9 or higher and the pigment products having a higher content of free fatty acid up to 1.5% yield a clarity scale rating of at least 8. The hydrophobic pigment products having a free fatty acid content above 1.5% yield coating composition products which exhibit a sharp decrease in clarity and compatibility. Hydrophobic pigment products having a content of 1.6% acetone-extractable hydrophobic fatty acid evaluated in the compatibility test vehicle yield coating compositions which are undesirably hazy in appearance. At 1.7% free state, acetone extractable hydrophobic fatty acid in the hydrophobic pigment product, the resulting test coating composition is characterized by a clarity scale rating of about 5. Opacity in the test coating composition is approached when the content of free state, acetone extractable hydrophobic fatty acid in the colloidal pigment product exceeds 2%. For example, in the range of 2% to 3% of acetone extractable hydrophobic fatty acid for the hydrophobic colloidal pigment product, the test coating composition is characterized by a clarity rating ordinarily no greater than 3.

The hydrophobic colloidal hydrous iron oxide pigment product of my present invention, in addition to being compatible in the test vehicle based on the polymer of methyl methacrylate, similarly exhibits superior compatibility and clarity when mixed in ordinary proportions with other clear, compatible synthetic polymer coating vehicles whereof the volatile liquid organic solvent includes a major weight proportion of toluol, xylol, high solvency petroleum naphtha or like non-polar volatile liquid organic component. Typical organic solvent soluble polymers useful as the film-forming coating component are the polymers of lower alkyl esters of methacrylic acid having a $C_1$ to $C_4$ alkyl group, such as methyl methacrylate, ethyl methacrylate, propyl methacrylate, isopropyl methacrylate, isobutyl methacrylate, butyl methacrylate, isobutyl/butyl methacrylate interpolymer, copolymers of mixtures of these esters, preferably including at least 75% of methyl methacrylate, copolymers and terpolymers of these esters including up to 10% of methacrylic acid or acrylic acid as a monomer component, homopolymers and copolymers of $C_1$ to $C_4$ alkyl acrylates, copolymers of one or more of said acrylates and one or more said methacrylates, copolymers of styrene and one or more of the indicated methacrylates and acrylates, styrene terpolymers such as the polymerization product of styrene, $C_1$ to $C_4$ alkyl acrylate and methacrylic acid, polymeric diesters of aliphatic diols and methacrylic acid, glycidyl methacrylate, solvent-soluble copolymers of vinyl chloride and vinyl acetate, non-drying, semi-drying and drying glyceride oil modified alkyd resins, alkyd resins in combination with heat-reactive aldehyde condensation resins such as urea/formaldehyde resins and melamine/formaldehyde resins, epoxyhydroxy polyether resins such as derived from condensation of epichlorohydrin and bisphenol, and glyceride oil fatty acid esters of such epoxyhydroxy polyether resins.

Useful polymers derived from a polymerizable alpha ethylenically unsaturated monomer or a mixture of such monomers, ordinarily will have an average molecular weight of at least 50,000, the molecular weight ranging up to a value which will provide a liquid solution at a practical concentration for coating use. Ordinarily an average molecular weight up to 200,000 provides practical solution concentrations. In the case of polymers of methyl methacrylate, including homopolymers and copolymers thereof with up to 25% of at least one monoethylenically unsaturated monomer copolymerizable therewith, which are particularly preferred as the film-forming polymer of the coating vehicle, the molecular weight preferably is in the range of 55,000 to 105,000.

In addition to the polymer and the volatile solvent therefor, the coating vehicle can include small effective proportions of innocuous compatible modifiers such as plasticizers, metallic driers, bodying agents, fungicides, ultraviolet screening agents, and like functional additives.

The pigmented coating composition can contain other transparent pigments and light stable organic coloring matter to modify the color produced by the hydrophobic colloidal hydrous iron oxide pigment products. Use of opaque pigments in combination with the pigment product of this invention ordinarily is avoided because the resulting opacity masks the normally visible advantageous contributions of the hydrophobic colloidal hydrous iron oxide pigment product. Reflective metal flake, such as aluminum flake, can be included in the coating compositions to provide glamorous metallic finishes having enhanced brilliance and two-tone effect. The proportion of reflective metal flake can be varied to obtain the desired metallic effect and ordinarily the amount is at a level at which hiding is insignificant.

In formulating coating compositions which on drying yield transparent finishes, the hydrophobic colloidal hydrous iron oxide pigment product is mixed with the polymer coating vehicle in an amount which ordinarily does not exceed 15% by weight of the liquid coating composition with the ratio of the hydrophobic pigment per part by weight of the film-forming polymer ordinarily being no greater than 1. Preferably the pigment content is from 3% to 10% by weight of the product. In the particularly preferred polymer of methyl methacrylate coating compositions, the preferred pigment ratio is from 0.25 to 0.75 part of the hydrophobic colloidal hydrous iron oxide per part by weight of the film-forming polymer; and the total non-volatile content, usually consisting of the pigment plus the polymer, preferably ranges from about 10% to about 25% by weight of the liquid coating composition. With other classes of useful polymer coating vehicles, the non-volatile content of the coating composition can range practically from 5% to 70% by weight. Ordinarily the liquid coating compositions contain from 40% to 90% by weight of a volatile liquid organic diluent which comprises a major weight proportion of a non-polar volatile organic component and includes a solvent for the polymer.

Surprisingly, hydrophobic hydrous iron oxide pigment products having an acetone-extractable free fatty acid content of from 0.4% to 1.5% which exhibit superior compatibility and clarity in the test methacrylate polymer coating composition do not register the advantageous superiority over similar pigment products having a higher content of free state hydrophobic fatty acid when formulated in a cellulose nitrate lacquer vehicle in which the volatile content necessarily includes a major proportion of polar organic solvents to dissolve the cellulose nitrate. In this type of lacquer vehicle, the hydrophobic pigment product containing up to 3.5% of solvent extractable free hydrophobic fatty acid is equally as compatible as the pigment product containing 0.75% of the free fatty acid. Hydrophobic pigment products having the higher content of acetone extractable hydrophobic fatty acid are actually more advantageous in the cellulose nitrate vehicle because the higher content of free fatty acid stabilizes the pigmented lacquer composition against bodying and gelation during storage and ageing. For use in cellulose nitrate lacquers, the hydrophobic colloidal pigment product can have an acetone extractable content of hydrophobic fatty acid as high as 10% without adverse effect on the compatibility.

Hydrophobic hydrous iron oxide pigment products characterized by this higher content of solvent extractable hydrophobic fatty acid useful in cellulose nitrate lacquer formulation can be prepared either directly by initially using a higher ratio of the fatty acid component which provides the higher content of acetone extractable fatty acid or indirectly by initially preparing the invention product using a ratio which provides the content of acetone extractable hydrophobic fatty acid in the range of 0.4% to 1.5% and mixing therewith an additional amount of free hydrophobic fatty acid sufficient to provide the desired higher level of free fatty acid. In the latter instance, mixing preferably is at a temperature sufficient to readily dissolve the hydrophobic fatty acid in the volatile organic diluent. Another method, is to mix the invention hydrophobic pigment product having a content of 0.4% to 1.5% of free state, acetone extractable hydrophobic fatty acid with the cellulose nitrate lacquer vehicle in the presence of an appropriate supplemental amount of the hydrophobic free fatty acid, the ratio of the total hydrophobic fatty acid, including the supplemental free fatty acid and the fatty acid non-extractable by acetone, being preferably no greater than 0.8 part per part dry weight of the parent hydrous iron oxide pigment.

The following example is representative of a particularly preferred embodiment of the invention process on a commercial scale.

EXAMPLE 1

| First portion: | Pounds |
|---|---|
| Industrial xylol | 1800 |
| Coconut oil fatty acids | 611 |
| Second portion: | |
| Colloidal hydrous ferric oxide pigment, dry weight | 2089 |
| Water contained in the water wet pulp | 4211 |
| | 8711 |

The industrial xylol, also referred to as 10° xylol, is characterized by a distillation range of 135° C. to 146° C. by ASTM–D–850–47 and an aniline point of —44° C. or from 32° C. to 34° C. by ASTM–D–1012–49T.

The refined coconut oil fatty acids are characterized by a lauric acid equivalent content of at least 90% by weight, ordinarily at least 95% lauric equivalent, consisting mainly of lauric, caprylic, palmitic, capric, myristic and oleic acids, the acid number being in the range of 277 to 287 and the iodine number being no greater than 4.

The entire second portion represents water-wet hydrous ferric oxide pigment pulp commercially available as "Auric Brown Pulp" F–4–P. The dry weight pigment is based on the solids content of the pulp. In this example the total amount of water-wet pigment pulp consists of two lots of which lot 1 is characterized by a specific surface area corresponding to an acetone-extractable fatty acid content of 1.45% and lot 2 is characterized by a specific surface area corresponding to an acetone extractable fatty acid content of 1.66%. With a pigment product having a content of acetone extractable hydrophobic fatty acid of about 0.75% being desired, the coordinate on the line BE of the drawing having the value of 1.45% on the ordinate axis for lot 1 corresponds to a fatty acid ratio on the abscissa axis of 0.300 part of fatty acid, expressed as lauric acid, per part dry weight of the colloidal pigment pulp. Similarly, the coordinate on line BE having a value 1.66% of acetone extractable fatty acid on the ordinate axis corresponds to a value of 0.285 on the abscissa axis for the weight ratio of total hydrophobic fatty acid. In providing a total weight of about 2700 pounds of non-volatile content of the hydrophobic pigment product, the balance sheet for the composition is as follows.

Lot 1:
  Wet weight pigment pulp _____pounds__ 3200
  Pulp solids content _____percent__ 34.1
  Dry weight pigment _____pounds__ 1090
  Water in pulp _____do____ 2110
  Fatty acid required at 0.300 ratio ____do____ 326

Lot 2:
  Wet weight pigment pulp _____pounds__ 3100
  Pulp solids content _____percent__ 32.3
  Dry weight pigment _____pounds__ 999
  Water in pulp _____do____ 2101
  Fatty acid required at 0.285 ratio ____do____ 285
  Total fatty acid for lots 1 and 2 _____do____ 611
  Total dry weight pigment _____do____ 2089
  Total water in pigment pulp _____do____ 4211

The processing equipment consists essentially of a 1000 gallon carbon steel reaction mixer having two separate jackets for heating and cooling, an agitator having a 40 H.P. drive, a loading port, a distillation port, and a drain port; a condenser, connected with the distillation port, having a heat transfer area of about 120 square feet; a water-separation receiver for the distillate having a capacity of about 40 gallons and having connected therewith a supplementary water separator of about 1000 gallons capacity; a decanting pump having a flexible intake conduit and intake float which provides for positioning the intake just above the interface of the supernatant water layer and the hydrophobic layer, and controls for regulating the temperature and agitation.

Initially, as step (a), the xylol is charged into the reaction mixer and heating is commenced with the temperature controls set for 60° C. to 65° C. The coconut oil fatty acids, preferably premelted in the supplier's drum are loaded through the charging port. The xylol and fatty acids are agitated until the charge registers a temperature of 60° C. As step (b), the water-wet pigment pulp is charged in individual drum quantities with agitation between each drum charge to insure good distribution. During the pigment charging cycle, the heat input to the reaction mixer is increased to maintain the temperature in the range of 50° C. to 60° C. After the pigment pulp is charged, the charging port is sealed and the reaction mixture is moderately agitated for 60 minutes at 60° C. to 65° C. Thereafter as step (c), agitation is discontinued and during a 30–60 minute settling period, the water of the water-wet pulp and water released during the reaction are allowed to form a clear supernatant liquid layer ready for decantation. As step (d), this water layer is removed by the decanting pump withdrawing the layer to the level of the intake float just above the interface between the water layer and hydrophobic layer. Then as step (e), azeotropic distillation is initiated by heating, with agitation, the remaining contents of the reaction mixer to the boiling point of the water/xylol azeotrope in the range of 92° C. to 95° C. The cooling of the condenser is controlled to about 30° C. for the effluent liquid distillate delivered to the receiver wherein the water is separated and is periodically drained into the supplementary separator. Xylol in the distillate forms a supernatant layer in the receiver and is returned to the reaction mixer. Distillation is continued until the temperature of the fluid content of the reaction mixer reaches 133° C. to 135° C. As step (f), the hydrophobic pigment product is cooled to about 40° C. with agitation being continued while cold water is passed through the cold water jacket. The product is sampled for solids determination with agitation and cooling continuing to a temperature of about 30° C. When the results of the solids determination are available, the product is adjusted to 60% solids content or desired lower content by addition of an appropriate amount of xylol which is uniformly mixed into the hydrophobic pigment composition.

While the above described process represents the particularly preferred practice of the invention, the indicated process steps are not limited to the specific conditions indicated except that the hydrophobic fatty acid ratio to dry weight colloidal pigment shall be limited as defined by the area ACDF, preferably by the area JKLM. In step (a), while xylol is particularly preferred as the non-polar solvent, toluol, high solvency petroleum naphthas and aliphatic hydrocarbons can be substituted wholely or in part for the xylol. Sole use of aliphatic hydrocarbons preferably is avoided because these diluents ordinarily are either relatively poor solvents or non-solvents for the synthetic polymers contained in coating vehicles into which the hydrophobic pigment product is to be mixed. The volatile organic diluent in initial step (a) is water-insoluble and includes a component which is a solvent for the fatty acid and a component capable of functioning as a water-carrier in azeotropic distillation. For these purposes, the diluent includes at least a major weight proportion of a non-polar solvent having a boiling end point preferably above 100° C. and preferably no greater than 200° C.

Although coconut oil fatty acids, a mixture of hydrophobic fatty acids including a preponderance of lauric acid, are specified in the example process, lauric acid, other $C_8$ to $C_{16}$ hydrophobic saturated aliphatic monocarboxylic acids derived from natural occurring fats and oils and mixtures of $C_6$ to $C_{24}$ hydrophobic fatty acids including a major weight proportion of the indicated $C_8$ to $C_{16}$ saturated aliphatic monocarboxylic acids (e.g. lauric, caprylic, capric, myristic, and palmitic), can be substituted wholely or in part for the coconut oil acids. Preferably the fatty acid is lauric acid or a mixture of the $C_8$ to $C_{16}$ fatty aliphatic monocarboxylic acids including lauric acid in major proportion on a molar basis.

The solute concentration of the fatty acid in the solution in step (a) is not significantly critical and can be varied to provide the necessary ratio of total fatty acid at the desired content of free-state acetone extractable hydrophobic fatty acid in excess of the surface demand of the colloidal pigment for a molecularly-thin, unextractably bound surface layer of the hydrophobic fatty acid, the desired consistency of the reaction mixture during processing and the desired pigment concentration in the hydrophobic pigment product. It is practical to use a concentration of from about 5% up to 35% by weight of the hydrophobic fatty acid in the volatile organic diluent in step (a), preferably from about 10% to 30%.

Solution of the fatty acid in the organic diluent is facilitated by heating and agitation. Heating can be up to a temperature of about 90° C., but inasmuch as heating in step (b) is at a temperature preferably from 55° C. to about 75° C., this temperature range is also preferred in step (a).

In step (b), the water-wet hydrous iron oxide pigment pulp characterized by the pilot process is combined with the fatty acid solution prepared in step (a) in such proportions that the weight ratio of the hydrophobic fatty acid, expressed as lauric acid, per part dry pigment weight is defined by the area ACDF, preferably by the area JKLM. The larger operative area provides a product characterized by a content of acetone-extractable, free state fatty acid from 0.4% to 1.5%, expressed as lauric acid, based on the non-volatile content of the product and the preferred smaller operating area JKLM provides the product with a content of acetone extractable hydrophobic fatty acid from 0.5% to 1.0% expressed as lauric acid, on the indicated basis.

As indicated, it is desirable to use only lots of pigment having a specific surface area corresponding to a free fatty acid content no greater than 3.5% as characterized at the described 0.35 pilot ratio of refined coconut oil acids. Preferred lots of pigment have a specific surface area corresponding to a free fatty acid content no greater than 3% at the characterizing 0.35 ratio. Colloidal hydrous ferric oxide pigment having a relatively smaller specific surface area as characterized by a free hydrophobic fatty acid content in the upper portion of the ordinate scale are further characterized as having as relatively larger average pigment-diameter and as being more red in tone in comparison with colloidal hydrous ferric oxide pigment having a larger specific surface area as characterized by a free fatty acid content in the lower portion of the ordinate scale which is more yellow in tone. Thus blending of lots of pigment to a median value of specific surface area provides for greater uniformity in color tone.

The water-wet hydrous iron oxide pigment pulp can be any of the hydrous ferric oxide pigments and hydrous ferric/ferrous oxide pigment pulps prepared as described in U.S. Patents 2,335,760 and 2,466,770, or mixtures of such pulps providing they have a specific surface area corresponding to a free fatty acid content no greater than 3.5% as characterized at the 0.35 pilot ratio and defined by the ordinate axis of the graph. Pigment lots having a specific surface area corresponding to a higher free fatty acid content up to about 5% can be mixed in limited proportion with appropriate lots having a specific surface area corresponding to a lower free fatty acid content in conformance with the indicated upper limit of 3.5% for the mixture. The proportion of pigment characterized by a free fatty acid content greater than 3.5% preferably should not exceed 20% by weight of such mixtures.

Commercial pigment pulps are available at a pigment content of from about 30% to about 45% by weight, the balance consisting essentially of water. The process is operative practically with lower concentration pigment pulps, but ordinarily a water-wet pulp having a pigment content of at least 20% is desirable in minimizing the water content which must be subsequently removed from the reaction composition.

The average particle diameter of the starting colloidal hydrous iron oxide pigment is less than 100 millimicrons with individual particles ranging from about 1 to about 300 millimicrons in diameter. The average particle diameter ordinarily is less than 50 millimicrons and generally is in the range of 10–30 millimicrons.

The following is typical of the preparation of colloidal hydrous ferric oxide pigment pulp which pulp can be substituted for the indicated purchased pigment pulp on a dry weight basis in the example.

PREPARATION OF HYDROUS FERRIC OXIDE PIGMENT PULP 278 parts of ferrous sulfate ($FeSO_4 \cdot 7H_2O$) are dissolved in 1000 parts of water and to this solution are added 18.6 parts of sodium chlorate ($NaClO_3$) and 49 parts of sulfuric acid (100% basis). The solution is heated to about 82° C. and held at this temperature for about 30 minutes to oxidize the ferrous iron to ferric iron. A solution of 117 parts of caustic soda in about 500 parts of water is slowly added to the resulting solution of ferric sulfate over a period of about 20 minutes to precipitate the ferric iron as a hydrous ferric oxide. After addition of the caustic, the aqueous slurry has a pH ordinarily in the range of 3 to 5, more or less caustic being used to obtain the preferred pH of 4.0. After striking the pigment, the aqueous slurry is maintained at a temperature in the range of 82° C. to 88° C. and is stirred with moderate agitation for about 2 hours. Thereafter the precipitated hydrous ferric oxide pigment is separated from its mother liquid and the pigment is washed with water until the filtrate is free from water-extractible sulfates and chlorides The processing temperature in step (b) can be from 50° C. to 90° C. and is preferably from 55° C. to 75° C. Mixing ordinarily is at moderate agitation for a period of from 30 minutes to about 150 minutes. The degree of agitation and mixer speed can be varied widely, a longer processing period ordinarily being associated with slow speed mild agitation. If foaming occurs during initial mixing, the foaming can be reduced or eliminated by increasing the mixer speed.

In the initiation of step (c), heating and mixing are discontinued and the water released during the processing step (b) forms a supernatant liquid layer as the hydrophobic pigment phase settles. Ordinarily the supernatant water layer is clear and ready for decantation after a settling period of from 30 to 60 minutes. The settling period can be extended to any practical length of time as desired. Poor water separation is indicated if the water layer is not clean and free from color characteristic of the pigment. Poor water separation ordinarily can be remedied by an additional heating and mixing period at a temperature in the upper portion, i.e. at 70° C. to 90° C., of the processing temperature range if the initial processing temperature was in the lower portion of the temperature range. This reheating is followed by a second settling period. In extreme cases where the depth of the water layer is insufficient for decantation, the entire amount of released water is removed by azeotropic distillation. This condition is a rarity and does not occur if the lots of water-wet pigment pulp contain an ordinary amount of water.

In step (d), except for the extreme cases mentioned above, a major proportion of the released water can be removed by decantation. While it is convenient and preferred to initially remove a major proportion of the released water by decantation, other ordinary water removal means can be substituted therefor as the initial water separation step, but these alternative means ordinarily involve deviation from the simplicity of the processing equipment.

In step (e), the processing conditions are dictated by the characteristics of the azeotrope. Distillation is continued until the condensed volatile effluent of the distillation is water-free or until the temperature of the residual content in the still reaches a predetermined temperature corresponding to a water-free distillate. At distillation temperatures up to 100° C., water is ordinarily used as the heat transfer medium and steam ordinarily is used as the heating medium at higher temperatures. Other appropriate liquid media can be used to transfer heat to the contents of the reaction vessel. It is preferred that the temperature of the contents of the reaction vessel (still) during distillation does not exceed 150° C. Thus, the liquid organic diluent should include a component capable of forming an azeotrope with water having a boiling point significantly below 150° C. Xylol and toluol are preferred as organic components of the azeotrope. The length of the distillation period is dictated by the rate and the amount of water to be removed. The hydrophobic pigment product is adequately free from water when the analytical free water content is no greater than 0.5% by weight. Products processed to a still temperature of 133° C.–135° C. using xylol as the diluent ordinarily are characterized by a residual free water content of less than 0.3%.

After removal of the water is adequately complete, the non-volatile content of the product is determined and the product is adjusted to the desired concentration either by addition of volatile liquid organic diluent or by continuing to remove diluent by distillation to obtain a higher concentration.

Ordinarily cooling step (f) is commenced before the analytical results for the non-volatile concentration are available. Cooling can be forced or natural. The reaction vessel preferably is provided with a cooling jacket and the product is force cooled to a temperature between about 40° C. and ordinary room temperature, using agitation to facilitate heat transfer. After the analytical results are available, adjustment to any desired lower concentration can be made during the cooling step or after the product has cooled to room temperature. The hydrophobic pigment product in fluid form at a practical viscosity for handling ordinarily has a non-volatile content from about 10% ot about 70% by weight, i.e. the content of the volatile organic diluent ordinarily is correspondingly from 90% to 30% by weight. Preferably, the non-volatile content of the fluid hydrophobic pigment product is from 25% to 65% by weight. However, the product can be prepared in particulate solid form as a dry powder practically free of the volatile organic diluent by supplementing the described process with a spray drying step. The fluid product can be reconstituted by mixing the dry powder product with an appropriate amount of the volatile organic diluent. The dry powder product can be used as a mix-in pigment composition in the same manner as the fluid product with equivalent results.

EXAMPLE 2

Methacrylate Resin Coating Composition

| | Parts by wt. |
|---|---|
| Hydrophobic pigment product of Example 1, 60% non-volatile content in xylol | 16.7 |
| Xylol | 8.3 |
| Toluol | 41.5 |
| Polymer of methyl methacrylate, 40% solution in toluol and acetone | 33.5 |
| | 100.0 |

The polymer of methyl methacrylate is the copolymer of 98 parts of methyl methacrylate and 2 parts of methacrylic acid by weight having a relative viscosity of 1.13. The copolymer is dissolved in a mixture of 60 parts of toluol and 40 parts of acetone by weight to a polymer concentration of 40% by weight.

In preparing the coating composition, the hydrophobic pigment product is slowly thinned with the xylol and toluol and then the polymer solution is slowly added to the thinned pigment product and mixed therein until the composition is uniform. Preferably, the mixing is from about 60 minutes to about 300 minutes, the temperature during mixing preferably being between ordinary room temperature of about 25° C. to about 50° C.

The resulting compatible liquid coating composition having a pigment content of 10% and a copolymer content of 13.4% by weight is clear and transparent. The enamel resulting from this composition flowed out on glass and dried, is characterized by a clarity scale rating of 9.

The product of Example 2, in addition to being useful per se as a coating composition, can be used if desired as an intermediate product to supply the hydrophobic hydrous iron oxide pigment composition in formulating other compatible polymer coating compositions which may include other pigments dispersed therein by ordinary means.

EXAMPLE 3

Alkyd Resin Coating Composition

| | Parts by wt. |
|---|---|
| First portion: | |
| Pigment product of Example 1 (60% non-volatile content) | 9.2 |
| Xylol | 35.0 |
| Second portion: | |
| Alkyd resin A solution (67% non-volatile content) | 30.8 |
| Third portion: | |
| Melamine/formaldehyde resin solution (55.5% non-volatile content in butyl alcohol) | 25.0 |
| | 100.0 |

The alkyd resin A is a 37% oil length coconut oil modified glyceryl phthalate resin having an acid number of 10 and a hydroxyl number equivalent to 5.6% of glycerol. The resin solution is at 67% non-volatile content in a mixture of 50 parts toluol and 50 parts of high solvency petroleum naphtha having a boiling range of about 150° C. to 190° C.

The melamine/formaldehyde resin is the equivalent of American Cyanamid's "Melmac" 248-8 except for use of butyl alcohol as the volatile diluent.

The first portion is mixed about 20 minutes and the second portion is slowly added thereto and the combined portions are mixed 60 minutes. Thereafter the third portion is added, preferably in two or more increments including 10 to 20 parts in the first increment with about 60 minutes of mixing prior to addition of the second increment. After addition of the third portion, the entire composition is mixed 60 minutes.

The resulting compatible liquid coating composition is clear and transparent. A dry enamel flow out of this composition on glass is characterized by a clarity scale rating of 9. In this liquid coating composition, the pigment content is 5.5% and the total non-volatile film-forming organic vehicle is 34.9% consisting of about 21.0% alkyd resin and 13.9% melamine/formaldehyde resin.

EXAMPLE 4

Alkyd Resin Coating Composition

| | Parts by wt. |
|---|---|
| First portion: | |
| Hydrophobic pigment product of Example 1 (60% non-volatile content) | 19.7 |
| Xylol | 22.7 |
| Calcium naphthenate solution, 4% Ca in mineral spirits | 1.5 |
| Second portion: | |
| Alkyd resin B solution (55% non-volatile content) | 56.1 |
| | 100.0 |

The alkyd resin B is a 46% oil length soya oil modified glyceryl phthalate resin, i.e. a drying oil modified type alkyd resin, having an acid number of about 25 and a hydroxyl number equivalent to 0.9% of glycerol. The solvent therefor consists of a mixture of 85% of high solvency petroleum naphtha having a boiling range of 130° C. to 195° C. and an aniline point of −13° C. and 15% by weight of mineral spirits.

In preparing the coating composition, the first portion is mixed 30 minutes, the second portion is slowly added thereto over a 30 minute period and the entire composition is mixed for 60 minutes. The resulting liquid coating composition is clear and transparent. A dry enamel resulting from drying a thin film of the liquid coating composition for 16 hours is characterized by a clarity scale rating of 8.5. The pigment content of the compatible liquid coating composition is 11.8% and the content of alkyd resin B is 30.8% by weight.

EXAMPLE 5

Metallic Methacrylate Resin Coating Composition

| First portion: | Parts by wt. |
|---|---|
| Coating product of Example 2 | 20.7 |
| Phthalocyanine green dispersion, roller-milled | 30.4 |
|     Phthalocyanine green pigment — 3.0% | |
|     Amine-treated bentonite pigment ("Bentone" 34, National Lead Co.) — 3.0% | |
|     Polymeric methyl methacrylate (40% solution in 60 toluol/40 acetone mixture) — 59.0% | |
|     Xylol — 35.0% | |
|         100.0% | |
| Aluminum pigment dispersion | 5.3 |
|     Aluminum tinting paste #222 (Aluminum Co. of America) (65% flake pigment/35% mineral spirits and naphtha) — 7.0% | |
|     Polymeric methyl methacrylate (40% solution in toluol and acetone) — 60.0% | |
|     Xylol — 33.0% | |
|         100.0% | |
| Copolymer of methyl methacrylate (40% solution same as used in Example 2) | 15.2 |
| Benzyl butyl phthalate plasticizer | 5.7 |
| Second portion: | |
| Cellulose nitrate solution (2.4% solution of 350 second viscosity lacquer grade cellulose nitrate in 75/25 acetone/"Cellosolve" acetate) | 22.7 |
| | 100.0 |

The polymer used in the respective aluminum flake and phthalocyanine green pigment dispersions is methyl methacrylate homopolymer having a relative viscosity of 1.16.

"Cellosolve" acetate is the acetic acid ester of ethyleneglycol monoethylether.

The first portion is mixed 60 minutes, the second portion is slowly added with mixing over a 30 minute period and the entire composition is then mixed 60 minutes.

In view of the pigmentation including aluminum flake and bentonite pigment in addition to the transparent hydrous iron oxide pigment and phthalocyanine green pigment, the coating composition and the dry polychromatic lacquer finish, green in color, prepared therefrom are not ratable on the clarity scale. However, this coating composition and the dry finish thereof exhibit superior brilliance and two-tone effect in comparison with the same composition differing only in that the hydrophobic hydrous iron oxide pigment product is characterized by an acetone-extractable free hydrophobic fatty acid content of 1.7% in contrast with the product of Example 1 having an extractable free hydrophobic fatty acid content of 0.8%.

In the foregoing examples, all parts and proportions are on a weight basis unless otherwise designated.

Sheet metal automobile body parts having the products of Examples 3 and 5 respectively applied as top coat finishes over ordinary automobile sheet metal primer compositions and dried exhibit superior brilliance, transparency, and two-tone effect when respectively evaluated against parts similarly finished with comparative coating compositions correspondingly formulated with a hydrophobic colloidal hydrous ferric oxide pigment product having a content of 1.7% of acetone-extractable free coconut oil fatty acids expressed as lauric acid.

While there are disclosed above only a limited number of preferred embodiments of the products and processes of the invention, it is possible to produce other operative embodiments without departing from the inventive concept disclosed, and it is desired therefore that only such limitations be imposed on the appended claims as are stated therein or required by the prior art.

I claim:

1. A method of preparing a hydrophobic colloidal hydrous iron oxide pigment composition which comprises mixing a water-wet collodial hydrous iron oxide pigment plup with a preformed hydrophobic solution consisting essentially of a hydrophobic fatty acid component as the solute, the composition of said fatty acid solution consisting essentially of at least one $C_6$ to $C_{24}$ aliphatic monocarboxylic fatty acid including a preponderant weight proportion of at least one $C_8$ to $C_{16}$ saturated aliphatic monocarboxylic fatty acid, and a water insoluble volatile liquid organic diluent consisting essentially of a nonpolar organic solvent for said solute, heating the resulting mixture at a temperature from about 50° C. to about 90° C. for an affective period of at least 30 minutes sufficient to coat the colloidal pigment particles of said pigment with a surface layer of said hydrophobic fatty acid, non-extractable by organic solvent, allowing the resulting slurry of hydrophobically-surfaced colloidal pigment particles to settle in the absence of agitation, water released during said mixing and heating steps thereby forming a supernatant layer of free water, thereafter separating said free water from the water-wet hydrophobic pigment composition by water removal means including azeotropic distillation as the final step of water removal wherein the azeotrope includes water and said non-polar volatile liquid organic solvent, said azetropic distillation being continued until the liquid condensate of the volatile effluent is water-free, and then cooling the hydrophobic pigment product to a temperature below about 40° C., said starting colloidal hydrous iron oxide pigment having a specific surface area corresponding empirically to a content of acetone extractable hydrophobic acid in the range of about 0.4% to 3.5%, expressed as lauric acid, at a pigment-surface-characterizing total fatty acid weight ratio of 0.35 part of refined coconut oil fatty acids per part dry weight of colloid pigment as defined by the ordinate axis of the drawing, the total amount of said hydrophobic fatty acid in said processing mixture being defined by a fatty acid total weight ratio value on the abscissa axis of the drawing for coordinates within the area ACDF, said defined total weight ratio of said hydrophobic fatty acid component being sufficent to provide from 0.4% to 1.5% of acetone-extractable, free state hydrophobic fatty acid, expressed as lauric acid based on the total non-volatile content of the hydrophobic pigment product, in excess of the amount of said hydrophobic fatty acid which satisfies the surface demand of said colloidal pigment particles for said non-extractable hydrophobic surface layer, and said preformed hydrophobic processing solution having a concentration of said fatty acid solute in the range of about 5% to 35% by weight in solution in said water-insoluble volatile liquid organic diluent.

2. The process of claim 1 wherein the total amount of said hydrophobic fatty acid component in said processing mixture is defined by a weight ratio value on the abscissa axis of the drawing for coordinates within the area JKLM of said drawing.

3. The process of claim 1 wherein said fatty acid component is a mixture of acids having the composition of coconut oil fatty acids and the weight ratio of said fatty acids to said dry weight pigment is defined by a coordinate on the line BE of the drawing, said ratio of total fatty acid component being at least 0.2.

4. The process of claim 1 wherein said heating step is carried out at a temperature from about 55° C. to about 75° C. for a period from about 60 minutes to about 150 minutes, said organic diluent consisting essentially of an aromatic hydrocarbon having a boiling endpoint above 100° C. and no greater than 200° C., said fatty acid component including a preponderant proportion of lauric acid, and said pigment pulp consisting essentially of colloidal hydrous ferric oxide pigment and water.

5. The process of claim 1 wherein said water separation step includes an initial step of substantial removal of said free water by decantation of said supernatant water layer and removal of residual free water by said azeotropic distillation.

6. The process of claim 1 which includes, subsequent to said azeotropic distillation step, a further step of spray drying the organic-diluent-wet product, thereby providing the hydrophobic pigment product in dry powder form free from said volatile liquid organic diluent.

7. A hydrophobic colloidal hydrous iron oxide pigment composition consisting essentially of colloidal hydrous iron oxide pigment particles having a bound hydrophobic surface layer, non-extractable by organic solvent, of a hydrophobic fatty acid component the composition of which consists essentially of at least one $C_6$ to $C_{24}$ aliphatic monocarboxylic fatty acid including a major weight proportion of at least one $C_8$ to $C_{16}$ saturated aliphatic monocarboxylic fatty acid and an additional amount of said hydrophobic fatty acid component corresponding to 0.4 to 1.5% by weight of free state, acetone extractable hydrophobic fatty acid, expressed as lauric acid based on the total non-volatile content of the hydrophobic pigment product, the total amount of said fatty acid component including said acetone extractable free state portion and said non-extractable surface bound portion corresponding to a weight ratio value, expressed as lauric acid, on the abscissa axis for a coordinate within the area ACDF of the drawing and said colloidal hydrous iron oxide pigment particles, minus said surface bound layer of hydrophobic fatty acid component, having a specific surface area corresponding empirically to a content of free state acetone extractable coconut oil fatty acids, expressed as lauric acid, in the range of about 0.4% to 3.5% at a particle surface characterizing ratio of 0.35 part of refined coconut oil fatty acids per part dry weight of said colloidal pigment as defined by the ordinate axis of said drawing.

8. The hydrophobic pigment product of claim 7 having from 0.5% to 1.0% of said free state, acetone extractable hydrophobic fatty acid expressed as lauric acid, and a total content of said hydrophobic fatty acid component corresponding to a weight ratio value on said abscissa axis for a coordinate within the area JKLM of said drawing.

9. The hydrophobic pigment product of claim 7 wherein said pigment is colloidal hydrous ferric oxide pigment and said hydrophobic fatty acid component consists essentially of a mixture of $C_8$ to $C_{16}$ saturated aliphatic monocarboxylic fatty acids including a major molar proportion of lauric acid.

10. The hydrophobic pigment product of claim 9 wherein said mixture of hydrophobic fatty acids is represented by coconut oil fatty acids.

11. The hydrophobic pigment product of claim 7 which further includes a water-insoluble volatile liquid organic diluent comprising a non-polar organic solvent for said free state hydrophobic fatty acid component, said diluent being present in an amount from about 30% to about 90% by weight, based on the total weight of the product.

12. The pigment product of claim 11 wherein said volatile organic diluent consists essentially of an aromatic hydrocarbon characterized by a boiling end point above 100° C. and no greater than 200° C., and is present in an amount from about 35% to about 75°% based on the total weight of the product.

13. The product of claim 9 consisting essentially of said hydrophobically surfaced colloidal hydrous iron oxide pigment particles and said free-state, acetone extractable hydrophobic fatty acid component, said product being a dry, finely-divided particulate solid.

14. The hydrophobic pigment product of claim 11 wherein said pigment is colloidal hydrous ferric oxide pigment, said hydrophobic fatty acid component is coconut oil fatty acids, the content of said hydrophobic fatty acids present in the acetone extractable, free state being from about 0.5% to about 1.0%, expressed as lauric acid, based on the non-volatile content of the product, the total weight ratio of said hydrophobic fatty acids being defined by a value on said abscissa axis for a coordinate within the area of JKLM of said drawing, and said non-polar organic solvent is xylol.

15. A compatible clear pigmented liquid coating composition consisting essentially of an organic-solvent-soluble film-forming, synthetic organic polymer, a volatile liquid organic solvent therefor having a preponderant proportion of a non-polar organic solvent, and the hydrophobic colloidal hydrous iron oxide pigment product of claim 7, said hydrophobically surfaced pigment being present in an amount up to 15% by weight of said coating composition and at a weight ratio up to one part of said hydrophobic pigment per part by weight of said film-forming polymer, the non-volatile content of said coating composition being from 5% to 70% by weight, said film-forming polymer being characterized as clear and transparent in solution in said liquid organic solvent at a useful concentration corresponding to said non-volatile content of said coating composition minus the pigment content.

16. The product of claim 15 wherein said film-forming polymer consists essentially of a polymer of methyl methacrylate and said hydrophobic colloidal hydrous iron oxide pigment is present in an amount from 3% to 10% based on the total weight of the coating composition and at ratio of from 0.25 to 0.75 part per part by weight of said polymer of methyl methacrylate.

17. The product of claim 15 wherein said polymer consists essentially of a hydrophobic fatty acid modified alkyd resin.

18. An article having a coating of the product of claim 15 which coating has been dried by volatile loss of said solvent therefrom.

19. The article of claim 18 wherein said coating is a topcoat finish over an organic primer coat on a sheet metal substrate.

20. A transparent pigmented tinting composition having the following approximate composition:

| | Parts by wt. |
|---|---|
| Hydrophobic colloidal hydrous ferric oxide pigment product of claim 14, 60% non-volatile content in xylol | 16.7 |
| Aromatic hydrocarbon solvent consisting essentially of toluol and xylol | 49.8 |
| Polymer of methyl methacrylate, 40% non-volatile content in a mixture of 60% toluol and 40% acetone | 33.5 |
| | 100.0 | said polymer of methyl methacrylate being a copolymer of about 98 parts of methyl methacrylate and 2 parts of methacrylic acid and being characterized by a molecular weight in the range of about 55,000 to 105,000.

References Cited in the file of this patent

UNITED STATES PATENTS

| 2,335,760 | Hucks | Nov. 30, 1943 |
| 2,854,346 | Todd | Sept. 30, 1958 |
| 2,881,145 | Schmultzer | Apr. 7, 1959 |
| 2,917,400 | Edwards | Dec. 15, 1959 |